March 10, 1959      W. T. POPE, JR      2,877,414
PULSE TIME JITTER MEASURING DEVICE
Filed May 21, 1954      3 Sheets-Sheet 1
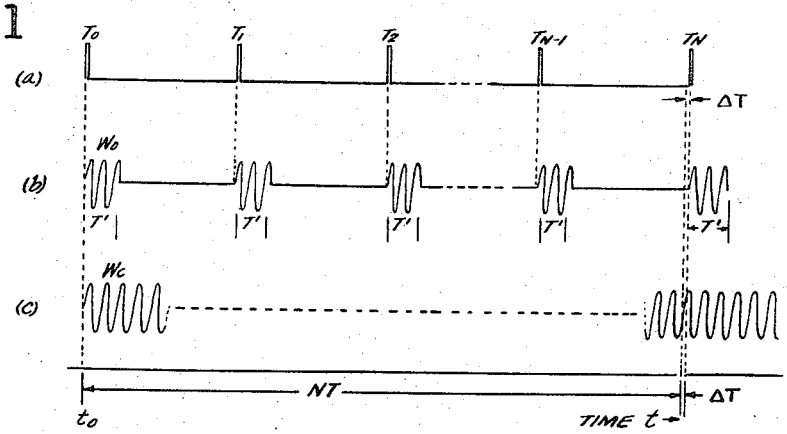
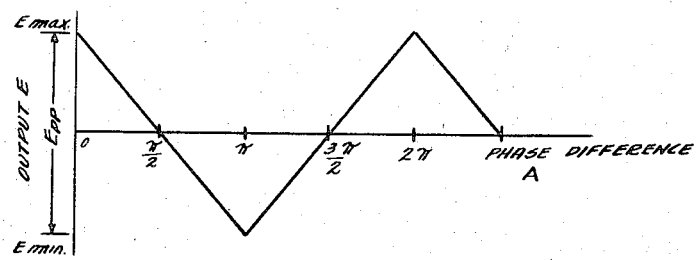
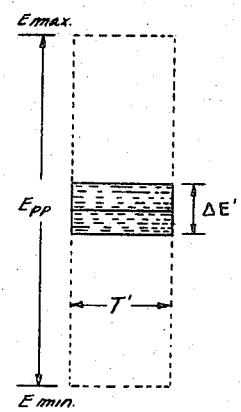
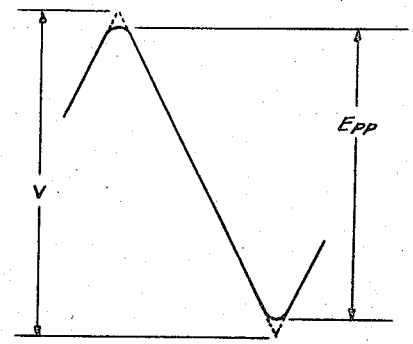
INVENTOR.
WILLIAM T. POPE, JR.
BY
AGENT and
ATTORNEY

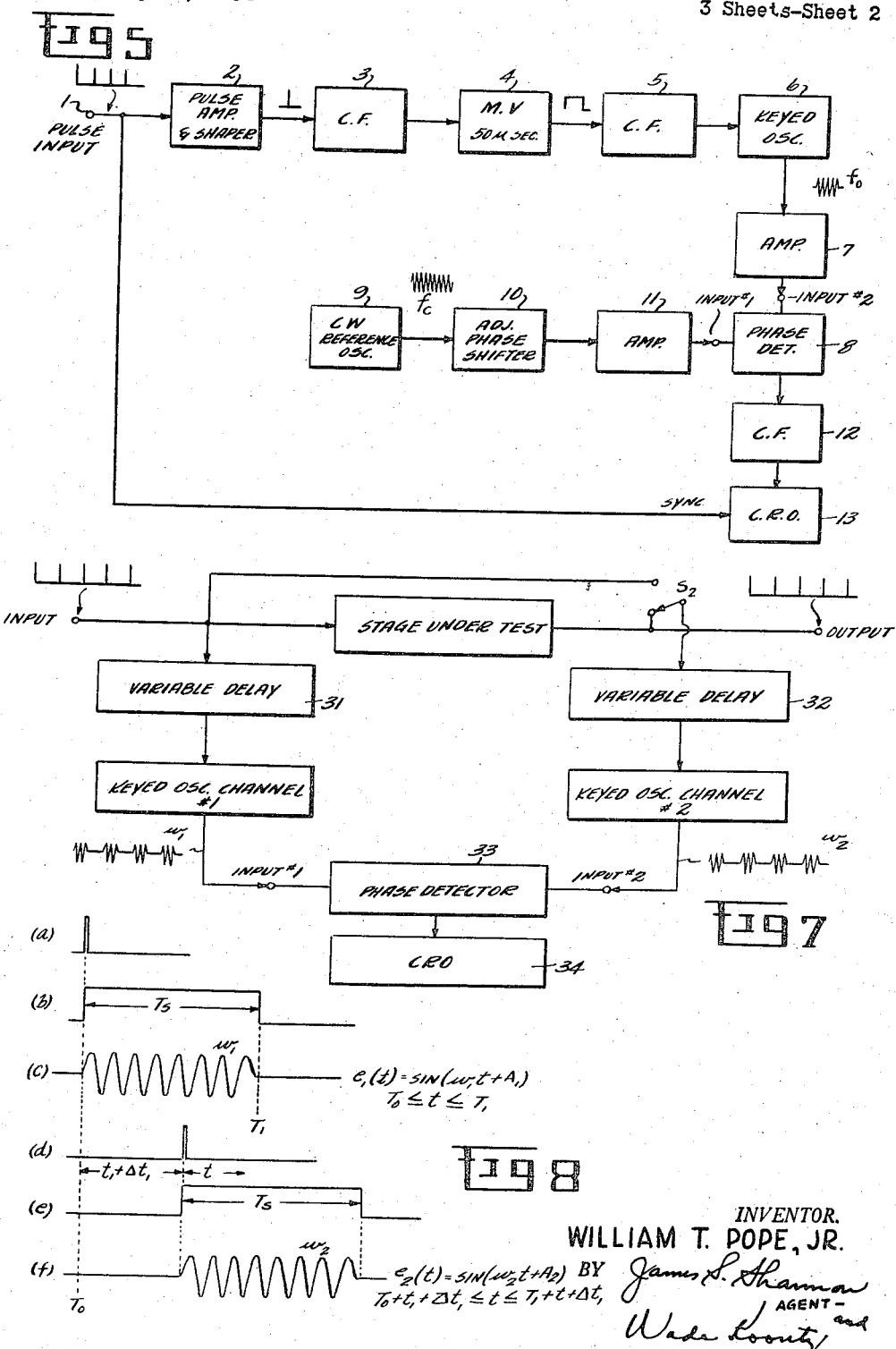

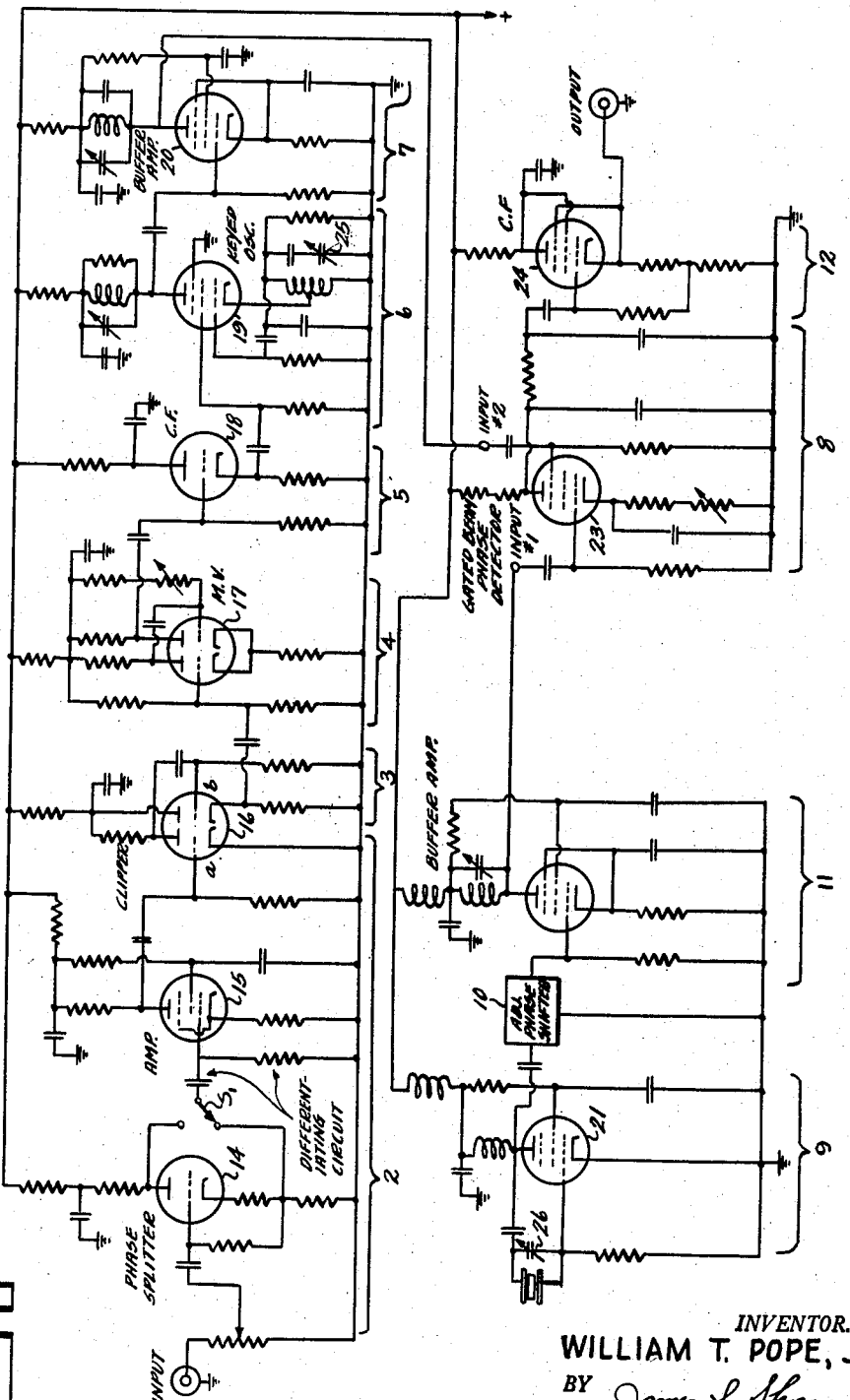

United States Patent Office 2,877,414
Patented Mar. 10, 1959

2,877,414

PULSE TIME JITTER MEASURING DEVICE

William T. Pope, Jr., Rome, N. Y., assignor to the United States of America as represented by the Secretary of the Air Force Application May 21, 1954, Serial No. 431,623

7 Claims. (Cl. 324—68)

(Granted under Title 35, U. S. Code (1952), sec. 266)

The invention described herein may be manufactured and used by or for the Government for governmental purposes without payment to me of any royalty thereon.

Present day applications of pulse techniques often place stringent requirements on the accuracy of the time interval between pulses. An example is MTI (moving target indication) radar. In such applications spurious variations in this time interval, referred to in the art as time jitter, affect the accuracy of the results obtained and it is therefore desirable that they be reduced to a minimum.

It is the object of this invention to provide means for measuring small amounts of time jitter in the repetition interval of a train of pulses. Time jitter may be introduced by the pulse train generating apparatus, and also by any apparatus through which the pulse train passes. It is accordingly a further object of the invention to provide means for measuring not only the overall time jitter but also the incremental jitter added to a pulse train by its passage through an amplifier, modulator or other circuit stage. Overall jitter is measured, in accordance with the invention, by comparing the phase of a continuous wave generated by a stable reference oscillator with that of an oscillator of the same frequency keyed by the pulse signal. In measuring incremental jitter the phases of two keyed oscillators are compared, one oscillator being keyed by the pulses entering and the other by the pulses leaving the stage being checked. The sensitivity of the measuring device depends upon the frequency of the two oscillators.

A more detailed description of the measuring device will be given in connection with the specific embodiments thereof shown in the accompanying drawings, in which:

Fig. 1 shows waveforms occurring in the measurement of overall time jitter;

Fig. 2 shows the idealized characteristic of a phase detector;

Fig. 3 illustrates the pattern obtained on the screen of an oscilloscope in making jitter measurements;

Fig. 4 shows the actual characteristic of a phase detector;

Fig. 5 is a block diagram of an overall time jitter measuring device in accordance with the invention;

Fig. 6 shows the circuit details of various elements of Fig. 5;

Fig. 7 is a block diagram of an incremental time jitter measuring device in accordance with the invention; and Fig. 8 shows waveforms appearing in the apparatus of Fig. 7.

Referring to the drawing, Fig. 1 illustrates the procedure for measuring overall time jitter in the train of pulses shown at (a) and having a repetition period T. The pulses initiate square waves which key a self-excited oscillator having an angular velocity $w_0$ and a fixed starting phase relative to the square wave. The keyed output of this oscillator is shown at (b) and has the form (1) $$e_0(t) = \sin(w_0 t + A_0)$$

where $A_0$ is the initial phase angle. The output of a continuous wave reference oscillator having an angular velocity of $w_c$ is shown at (c) and has the form (2) $$e_c(t) = \sin(w_c t + A_c)$$

where $A_c$ is the initial phase angle.

In the absence of time jitter any pulse $T_n$ of the train will occur at the time $t = NT$, N being any integer. In the presence of jitter this pulse will occur at a time that differs from NT by the amount of time jitter $\Delta T$. Further, in the absence of jitter and with $f_c$ and $f_0$ equal and a multiple of $$\frac{1}{T}$$

the phase difference between $w_0$ and $w_c$ will be constant throughout all the intervals T', while in the presence of jitter this phase difference will differ from the above constant value by an amount proportional to the jitter $\Delta T$. This may be shown as follows: Considering any pulse $T_n$ of the pulse train, the phase difference A between $w_0$ and $w_c$ during the interval T' corresponding to $T_n$ is (3) $$A = w_0 NT + A_0 - [w_c(NT + \Delta T) + A_c]$$

If $$f_0 = f_c = \frac{K}{T}$$

where K is any integer, (4) $$A = 2\pi KN + A_0 - 2\pi KN - \frac{2\pi K \Delta T}{T} - A_c$$

or, (5) $$A = A_0 - A_c - \frac{2\pi K \Delta T}{T}$$

Therefore, it is seen from (5) that if $\Delta T = 0$, A is constant and equal to $A_0 - A_c$; and that if $\Delta T \neq 0$, A differs from the constant value $A_0 - A_c$ by an amount proportional to $\Delta T$. Since time jitter is a rapidly varying phenomenon, $\Delta T$ will be a varying quantity causing a corresponding fluctuation of A from interval to interval about the constant phase difference $A_0 - A_c$. The value of this deviation at the beginning of any interval T' is given by the expression (6) $$\Delta A = \frac{2\pi K}{T} \Delta T$$

drived from Equation 5.

Fig. 2 shows the idealized characteristic of a phase detector. If two waves $w_0$ and $w_c$ of the same frequency are applied to such a detector the output will correspond to the phase difference A between the two waves. The output varies from a maximum at $A = 0$ to a minimum at $A = \pi$. If the initial phases $A_0$ and $A_c$, Equation 5, are so selected that $$A_0 - A_c = \frac{\pi}{2}$$

the detector output when $\Delta T = 0$ will be midway between E max and E min, thus establishing the operating point at the center of the straight portion of the characteristic between $A = 0$ and $A = \pi$. Varying values of $\Delta T$ will then cause the detector output to fluctuate in amplitude about the output at $$A = \frac{\pi}{2}$$

The operating point may also be established at $$\frac{3\pi}{2}$$

by appropriate adjustment of $A_0-A_c$ if desired.

A comparison of the amplitude fluctuation of the detector output to the maximum peak-to-peak output amplitude $E_{pp}$ may be used as a measure of the time jitter $\Delta T$. This may be shown as follows: From Fig. 2, $$(7) \quad \frac{\Delta E}{E_{pp}} = \frac{\Delta A}{\pi}$$

substituting the value of $\Delta A$ from Equation 6, $$(8) \quad \frac{\Delta E}{E_{pp}} = \frac{2\pi K}{T} \Delta T = 2f_c \Delta T$$

from which $$(9) \quad \Delta T = \frac{\Delta E}{E_{pp}} \cdot \frac{1}{2f_c}$$

or $$(9a) \quad \Delta T' = \frac{\Delta E'}{E_{pp}} \cdot \frac{1}{2f_c}$$

where $\Delta E'$ is the range of fluctuation of $\Delta E$ and $T'$ is the corresponding range of fluctuation of $\Delta T$.

In making actual measurements of time jitter the output of the phase detector is applied to an oscilloscope which gives a pattern similar to that shown in Fig 3. By slightly detuning the reference oscillator the phase difference A between $w_0$ and $w_c$ may be made to vary slowly between 0 and $\pi$ and the limits E max and E min established, from which $E_{pp}$ may be determined. E max and E min may also be determined by adjusting the phase difference between $w_0$ and $w_c$, using a suitable phase shifter, to values of 0 and $$\frac{\pi}{2}\left(\text{or } \frac{3\pi}{2}\right)$$

and denoting the difference in detector outputs at the two phase differences. With the frequency $f_c$ of the reference oscillator at its proper value $$\frac{K}{T}$$

the fixed phase difference $A_0-A_c$ between $w_0$ and $w_c$ is adjusted to $$\frac{\pi}{2}\left(\text{or } \frac{3\pi}{2}\right)\text{radians}$$

so that the amplitude of the detector output is approximately midway between E max and E min. $\Delta E'$, the range of fluctuation of E, is then determined by measuring the range of detector output amplitude fluctuation. Knowing $E_{pp}$, $\Delta E'$ and $f_c$, $\Delta T'$, the range of fluctuation of $\Delta T$, may be computed from Equation 9a, which however assumes the ideal detector characteristic of Fig. 2. Since this characteristic is not attained in practice, but one more like that shown in Fig. 4, $\Delta T'$ should be multiplied by a correcting factor F, less than unity, derived from the actual detector characteristic by extending its linear portions and equal to $$\frac{E_{pp}}{V}$$

as shown in Fig. 4. For highest accuracy measurements should be confined to jitter amplitudes $\Delta E'$ less than two-thirds the amplitude of the time base $E_{pp}$.

Fig. 5 is the block diagram of a jitter measuring device operating on the above principle. The pulse train to be checked is applied to input terminal 1 and thence through amplifier and shaper 2 and cathode follower 3 to one-cycle multivibrator 4 which is triggered by the pulses and produces square waves of approximately 50 microseconds' duration having leading edges coincident with the leading edges of the pulses. The square waves are applied through cathode follower 5 to oscillator 6 and key this oscillator, operating at frequency $f_0$, to produce the train of high frequency pulses shown in Fig. 1(b). These pulses are applied through amplifier 7 to input #2 of phase detector 8.

The continuous wave reference frequency $f_c$ is generated by oscillator 9 and applied through adjustable phase shifter 10 and amplifier 11 to input #1 of the phase detector. The output of the phase detector, which is proportional in amplitude to the phase difference between the waves applied to its two input terminals, is applied through cathode follower 12 to cathode ray oscilloscope 13, the sweep of which is synchronized with the original pulse input. Phase shifter 10 is utilized to set the value of the fixed phase difference between the two waves ($A_0-A_c$ in Equation 5) and to thereby select the desired operating point on the detector characteristic.

Suitable designs for elements 2–9, 11 and 12 of Fig. 5 are shown in Fig. 6. The pulse amplifier and shaper 2 comprises phase splitter stage 14, amplifier 15 and clipper 16a. Phase splitter stage 14 has switch $S_1$ associated therewith so that input pulses of either polarity may be employed. The cathode follower 3 is tube 16b in Fig. 6. One-cycle multivibrator 4, cathode follower 5, keyed oscillator 6 and buffer amplifier 7 are the stages comprising tubes 17, 18, 19 and 20, respectively, of Fig. 6. Reference oscillator 9 may be a crystal oscillator such as shown in connection with tube 21 while stage 22 corresponds to the buffer amplifier 11 of Fig. 5. The phase detector 8 of Fig. 5 may be of the gated beam type shown in Fig. 6 as tube 23 and associated circuit, a more detailed description of which may be found in General Electric Engineering Bulletin ET-B28. Cathode follower stage 12 of Fig. 5 may be a stage such as that in Fig. 6 containing tube 24. Phase shifter 10 may be of any suitable design capable of shifting phase up to slightly more than 90°.

The choice of the reference oscillator frequency depends on the order of magnitude of the jitter which is to be measured. The smaller the amount of jitter the higher the frequency of the reference oscillator should be. Amplitude jitter can be observed on the oscilloscope down to $\frac{1}{50}$ of the $E_{pp}$ amplitude. Referring to Equation 9, if $f_c=10$ mc. jitter down to $$\frac{1}{50} \times \frac{1}{2f_c} = .001 \text{ microseconds}$$

may be discerned. The maximum jitter that may be measured with this reference frequency is $$\frac{1}{2f_c} = .05 \text{ microseconds}$$

Lowering the reference frequency to 5 mc. permits measurement of jitter from 0.002 to 0.1 microsecond.

The time-on of the keyed oscillator should be sufficient to allow the oscillator to stabilize after the initial switching transient and also to give a video output pulse of convenient width for viewing on the oscilloscope. For reference frequencies of the above order and pulse repetition frequencies of from 2 to 4 kc., a time-on of 50 microseconds is satisfactory. In order to minimize the starting time jitter, the multivibrator triggering pulse should have a very fast rise time from a low impedance source. In order to permit adjustment of $f_c$ and $f_0$ to an integral multiple of the pulse repetition frequency, oscillators 6 and 9 must be tunable over a small range as provided for by condensers 25 and 26, respectively. The frequency range over which the oscillators must be tunable to meet this condition is $$\frac{PRF}{2}$$

In measuring incremental jitter an arrangement such as shown in Fig. 7 is used. The input pulses applied to stage 30, the stage under test, are also applied through variable delay 31 to keyed oscillator channel #1. Similarly the output pulses of stage 30 are applied through variable delay 32 to keyed oscillator channel #2. The two keyed oscillator channels are identical and each has the same circuitry as that shown preceding detector input #2 in Figs. 5 and 6. The output of keyed oscillator channel #1 is applied to input #1 of phase detector 33 and the output of keyed oscillator #2 is applied to the #2 input of the detector. The two outputs are of the same form, each consisting of a series of A. C. pulses having their leading edges coincident with the leading edges of the input or output pulses of the stage 30. The duration of the A. C. pulses is such that the A. C. pulses generated by corresponding input and output pulses of the stage under test overlap in time. The output of the phase detector 33 is applied to the oscilloscope 34 from which the time jitter may be determined as explained above in connection with the overall jitter measuring device.

The above is illustrated more clearly in Fig. 8. A pulse arriving at the input of stage 30 at $T_0$, shown at (a), will arrive at the output of the stage after an interval equal to $t_1 + \Delta t_1$, where $t_1$ is the fixed delay through the stage and $\Delta t_1$ is the time jitter introduced by the stage. The pulse at (a) generates the square wave at (b) which keys the oscillator in channel #1 to produce the wave at (c). Similarly the output pulse at (d) acts in channel #2 to generate the square wave at (e) and the keyed oscillator output wave at (f). As shown in Fig. 8, the duration $T_s$ of the square waves is made greater than $t_1 + \Delta t_1$ so that the waves at (c) and (f) overlap in time. This overlap should be sufficient for proper operation of the phase detector and such as to provide a video pulse of suitable width for viewing on the oscilloscope.

If the frequency setting of the keyed oscillators is such that $w_1 = w_2 = w_0$, then the phase difference A between the waves $w_1$ and $w_2$ in Fig. 8(c) and (f) is

(10) $\quad A = w_0(t_1 + \Delta t_1 + t) + A_1 - (w_0 t = A_2)$ where $t$ is measured from the leading edge of the pulse in Fig. 8(d) and $A_1$ and $A_2$ are the initial phases of $w_1$ and $w_2$.

Equation 10 may be simplified to

(11) $\quad A = A_1 - A_2 + w_0 t_1 + w_0 \Delta t_1$ from which, since $A_1$, $A_2$ and $w_0 t_1$ are constants,

(12) $\quad \Delta A = w_0 \Delta t_1$

As seen from Equation 11, when the time jitter $\Delta t_1 = 0$, A is a constant equal to $A_1 - A_2 + w_0 t_1$. $A_1$ and $A_2$ are controlled by delays 31 and 32, respectively, in Fig. 7, and $w_0 t_1$ is determined by the frequency $f_0$. By proper selection of these parameters $A_1 - A_2 + w_0 t_1$ may be made equal to $$\frac{\pi}{2} \left( \text{or } \frac{3\pi}{2} \right)$$

so as to establish the operating point at the center of the linear portion of the phase detector characteristic as shown in Fig. 2. In the presence of jitter the amplitude of the detector output fluctuates about the detector output at $\Delta t_1 = 0$. The range of this fluctuation $\Delta E'$ may be measured on an oscilloscope and compared with the measured value of $E_{pp}$, Fig. 2, to arrive at the corresponding overall time jitter $\Delta t_1'$. The relationship is

(13) $\quad \Delta t_1' = \frac{\Delta E'}{E_{pp}} \cdot \frac{1}{2f_0} \cdot F$ derived in the same manner as Equation 9a. F is the already discussed correction factor derived from the actual detector characteristic as explained in connection with Fig. 4. The value of $E_{pp}$ may be determined by slightly detuning one of the keyed oscillators or by means of variable delays 31 and 32.

The frequency $f_0$ is determined by the minimum and maximum jitter to be measured as already explained. Smaller amounts of jitter require higher frequencies which in turn reduce the maximum amount of jitter that may be measured. The minimum measurable jitter is also affected by the inherent jitter of the measuring device. The inherent jitter may be checked by triggering both channels in Fig. 7 by the same pulse train with delays 31 and 32 adjusted to provide the proper phase difference between channels $$\left( \frac{\pi}{2} \text{ or } \frac{3\pi}{2} \right)$$

The above described jitter checker is particularly useful in measuring the incremental time jitter produced by hydrogen thyratron modulators used in MTI radar equipment. Hydrogen thyratrons are also subject to a change in delay $t_1$ over a relatively long time interval. This drift may be measured while measuring jitter by noting the change in position of the jitter pattern over a long time interval.

The incremental jitter measuring device may also be used to measure pulse width jitter. This is accomplished by feeding both channels of Fig. 7 with the same pulses, by placing $S_2$ in its upper position, and by an opposite setting of the polarity selecting switches $S_1$, Fig. 6, in the two channels. With this arrangement, the differentiating circuits following the switches produce positive pulses from the leading edges of the pulses in one channel and from the trailing edges of the pulses in the other channel. The device then operates to measure the jitter between the positive pulses in the two channels.

I claim:

1. Apparatus for measuring the departure in time of a pulse with respect to a predetermined instant comprising means responsive to said pulse for generating a first wave having a fixed starting phase relative to said pulse, means for generating a second wave of the same frequency as said first wave and having a fixed starting phase relative to said instant, said waves coexisting for a plurality of cycles, and means coupled to each of said wave generating means for measuring the phase difference between said waves.

2. Apparatus for measuring the time jitter in a series of pulses relative to a predetermined corresponding series of instants, said apparatus comprising means actuated by each of said pulses for producing for a predetermined period a wave having a fixed starting phase relative to said pulse that is the same for all pulses, means for producing for a predetermined period following each of said instants a wave of the same frequency as said aforementioned wave and having a fixed starting phase relative to said instant that is uniform for all said instants, said predetermined periods being of such duration as to include a plurality of cycles of said waves and being at least in part coexistent, and means coupled to each of said wave producing means for measuring the range of fluctuation of the phase difference between said waves.

3. Apparatus for measuring the time jitter in a series of pulses of nominally constant repetition frequency, said apparatus comprising means for producing a continuous reference wave having frequency equal to an exact large multiple of said pulse repetition frequency, means actuated by each of said pulses for producing a wave having the same frequency as said reference wave and a fixed starting phase relative to said pulse that is the same for all pulses, said wave having a duration less than the interval between said pulses, and means coupled to each of said wave producing means for measuring the range of fluctuation of the phase difference between said waves.

4. Apparatus as claimed in claim 3 in which means connected to one of said wave producing means are provided for adjusting the fixed phase difference between said waves.

5. Apparatus for measuring the time jitter in a recurring nominally constant interval, said apparatus comprising means actuated at the start of said interval for generating a wave having a period short relative to said interval and a fixed starting phase relative to the start of said interval that is the same for all intervals, means actuated at the end of said interval for generating a wave of the same frequency as said aforementioned wave and having a fixed starting phase relative to the end of said interval that is the same for all intervals, said waves being coexistent for a plurality of cycles, and means coupled to each of said wave generating means for measuring the range of fluctuation of the phase difference between said waves.

6. Apparatus as claimed in claim 5 in which means connected to at least one of said wave generating means are provided for adjusting the fixed phase difference between said waves.

7. Apparatus for measuring the time jitter in the transmission delay of an electrical network having input and output circuits, comprising means for applying a series of electrical pulses to said input circuit, which pulses, after being delayed by said network, appear in said output circuit, means coupled to said input circuit and actuated by each of said input pulses for generating an electrical wave having a period short relative to said transmission delay and a fixed starting phase relative to said input pulse that is the same for all input pulses, means coupled to said output circuit and actuated by each of said output pulses for generating an electrical wave of the same frequency as said aforementioned wave and having a fixed starting phase relative to said output pulse that is the same for all output pulses, said waves being coexistent for a plurality of cycles, means forming part of at least one of the couplings between said wave generating means and said input and output circuits for adjusting the fixed phase difference between said waves, and means coupled to each of said wave generating means for measuring the range of fluctuation of the phase difference between said waves.

References Cited in the file of this patent

UNITED STATES PATENTS

| | | |
|---|---|---|
| 2,513,528 | Sohon | July 4, 1950 |
| 2,574,494 | Paomer | Mar. 13, 1951 |
| 2,561,182 | Crane | July 17, 1951 |
| 2,665,410 | Burbeck | Jan. 5, 1954 |
| 2,685,063 | Alsberg | July 27, 1954 |

OTHER REFERENCES

Official Gazette, July 19, 1949, vol. 624, No. 3, page 929, abstract of application Ser. No. 715,443, by Miller.